United States Patent
Tiefenbacher

(10) Patent No.: US 9,527,432 B2
(45) Date of Patent: Dec. 27, 2016

(54) SAFETY DEVICE FOR HEADLIGHTS WITH LASER LIGHT SOURCES AND METHOD FOR SHUTTING DOWN LASER LIGHT SOURCES IN CASE OF SAFETY-CRITICAL CONDITIONS

(71) Applicant: ZIZALA LICHTSYSTEME GMBH, Wieselburg (AT)

(72) Inventor: Ewald Tiefenbacher, Kemmelbach (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 348 days.

(21) Appl. No.: 14/369,880

(22) PCT Filed: Dec. 21, 2012

(86) PCT No.: PCT/AT2012/050205
§ 371 (c)(1),
(2) Date: Jun. 30, 2014

(87) PCT Pub. No.: WO2013/096984
PCT Pub. Date: Jul. 4, 2013

(65) Prior Publication Data
US 2014/0334167 A1    Nov. 13, 2014

(30) Foreign Application Priority Data

Dec. 29, 2011 (AT) .................. A 1905/2011

(51) Int. Cl.
*B60Q 1/02* (2006.01)
*B60Q 1/14* (2006.01)
*B60Q 11/00* (2006.01)
*F21S 8/10* (2006.01)
*F21W 101/10* (2006.01)
*F21Y 101/00* (2016.01)

(52) U.S. Cl.
CPC ............ *B60Q 1/1423* (2013.01); *B60Q 1/143* (2013.01); *B60Q 11/00* (2013.01); *B60Q 11/002* (2013.01); *F21S 48/1145* (2013.01); *F21S 48/1747* (2013.01); *F21S 48/31* (2013.01); *B60Q 2300/112* (2013.01); *B60Q 2300/114* (2013.01); *B60Q 2300/146* (2013.01); *B60Q 2300/45* (2013.01); *F21W 2101/10* (2013.01); *F21Y 2101/00* (2013.01); *F21Y 2115/30* (2016.08)

(58) Field of Classification Search
CPC .................................................. F21S 48/1747
USPC .......................................... 362/509; 315/82
See application file for complete search history.

(56) References Cited

U.S. PATENT DOCUMENTS 8,600,656 B2 * 12/2013 Mimeault ............ B60Q 1/0023
340/435

* cited by examiner

*Primary Examiner* — Thuy Vinh Tran
(74) *Attorney, Agent, or Firm* — Sutherland Asbill & Brennan LLP

(57) ABSTRACT

A device and a method for safety shutdown of the at least one laser light source (2) of at least one headlight (1) for a motor vehicle, the safety device having a vehicle-side subsystem and a headlight-side subsystem, wherein the two subsystems are connected to one another via an interface and are designed to exchange safety-relevant signals (sa1, sa2, sa3, SL, SP, SB, SC, SD), a monitoring arrangement (14) is designed to output control signals (sta, sts, stv) in the presence of safety-critical conditions, and a headlight controller (10) is designed to shut down the at least one laser light source (2), or keep it shut down, when such control signals (sta, sts, sty) are supplied.

15 Claims, 3 Drawing Sheets

Figure 1:
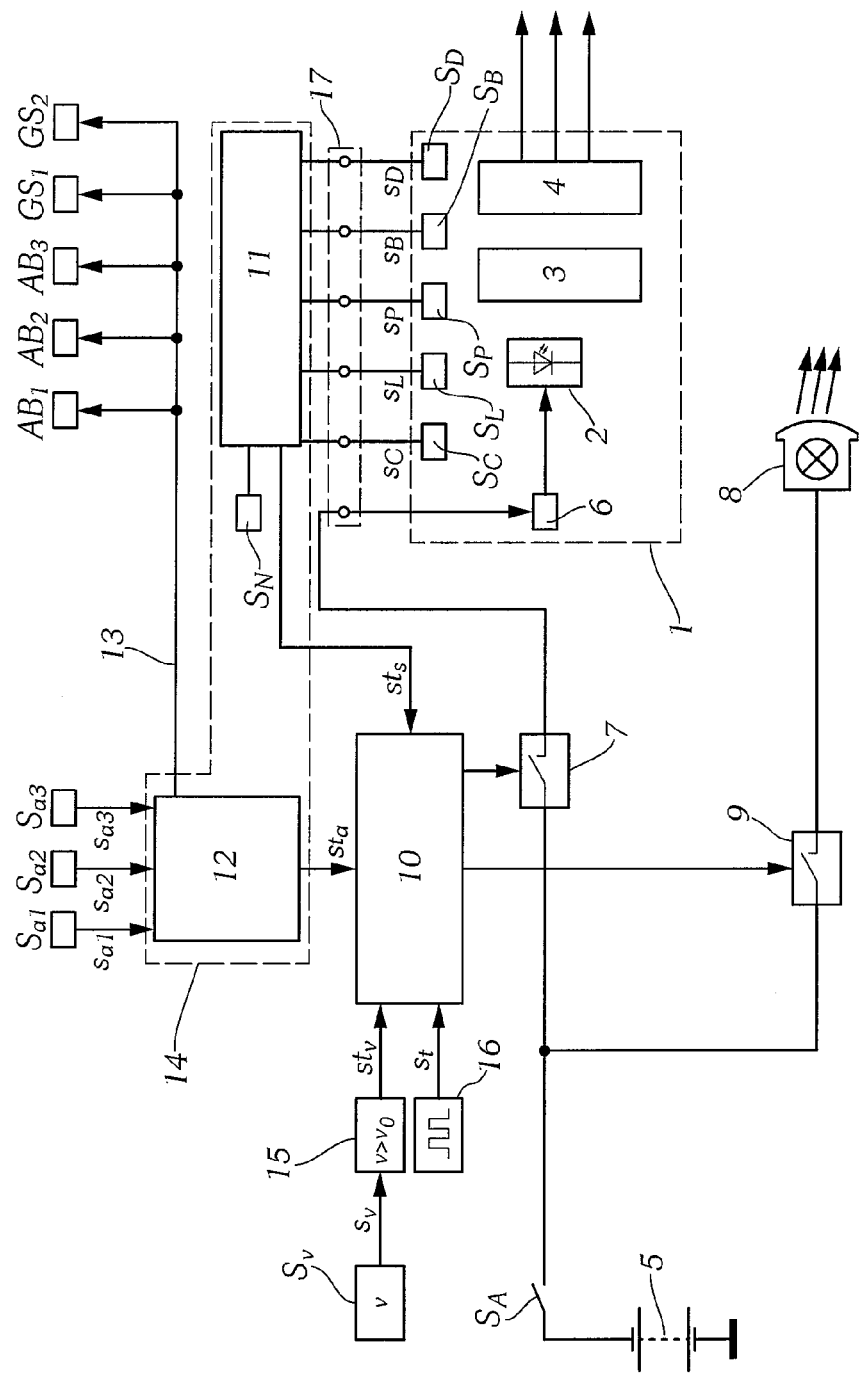

SAFETY DEVICE FOR HEADLIGHTS WITH LASER LIGHT SOURCES AND METHOD FOR SHUTTING DOWN LASER LIGHT SOURCES IN CASE OF SAFETY-CRITICAL CONDITIONS

The invention relates to a safety device for headlights with laser light sources, which is designed to shutdown laser light sources in safety-critical conditions, wherein a headlight unit has at least one laser light source, a light converter and an optics.

The invention also relates to a method for safety shutdown of the at least one laser light source of at least one headlight in a motor vehicle.

The use of laser light sources in motor vehicles is currently gaining in significance, since for example the dimensions of laser diodes are smaller compared with conventional light-emitting diodes, which enable more versatile and more efficient installation solutions, and the luminous density of the light bundle can also be significantly increased.

Laser diodes for use in motor vehicle headlights are currently operated with a power in the region of 1 W, however there are risks for the human (and animal) eye with lasers of more than just 2 mW. With the known solutions, however, there is no emission of a direct laser beam so as to avoid endangering the eyes of humans and other creatures by the extremely bundled high-power light beam. Rather, the laser beam is converted for example from blue light into white light on an intermediate converter, which for example contains a phosphor.

However, it should not be ruled out that in some circumstances, for example in the event of damage to the lighting system, as may occur inter alia in the event of an accident, or in the event of manipulation of the headlight, the laser beam or reflection thereof could enter the eye of people, such as passers-by, wherein this could then result in blindness.

With a headlight of the type in question, it is known from US 2011/0063115 A1 to absorb some of the irradiated light using photosensors, to examine the spectral properties of this light, and to shutdown the laser in the event of irregularities.

DE 10 2010 028 949 A1, without discussing the structure and function in greater detail, describes the situation in which a laser, of which the beam into a headlight is deflected via pivotable micromirrors onto phosphors, is shutdown if this deflection fails. The laser may also be shutdown in the case of an open headlight housing or if the headlight glass is broken.

The object of the invention is to create a universally usable safety device so as to avoid, where possible, an endangering of people by laser beams with motor vehicle lighting systems outside normal operation.

This object is achieved with a device of the type mentioned in the introduction, with which, in accordance with the invention, the safety device has a vehicle-side subsystem and a headlight-side subsystem, the two subsystems are interconnected via an interface and are designed to exchange safety-relevant signals, a monitoring arrangement is designed to output control signals in the presence of safety-critical conditions, and a headlight controller is designed to shutdown the at least one laser light source, or keep it shutdown, when such control signals are supplied.

The object is also achieved with a method for safety shutdown of the at least one laser light source of at least one headlight in a motor vehicle, in which, in accordance with the invention, safety-relevant signals are exchanged between a vehicle-side subsystem and a headlight-side subsystem via an interface and are supplied to a monitoring arrangement, and, from this, control signals are supplied to a headlight controller, wherein the laser light source is shutdown/kept shutdown with the occurrence of a safety-relevant signal corresponding to a critical condition.

Further expedient features are characterised in dependent Claims 2 to 9 and 13 to 27.

Figure 1A:
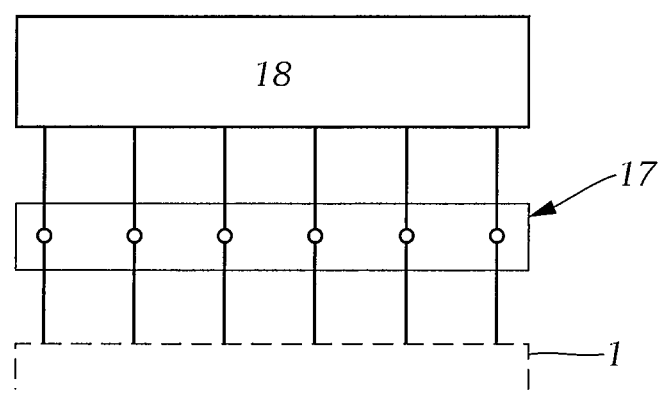
Figure 2:
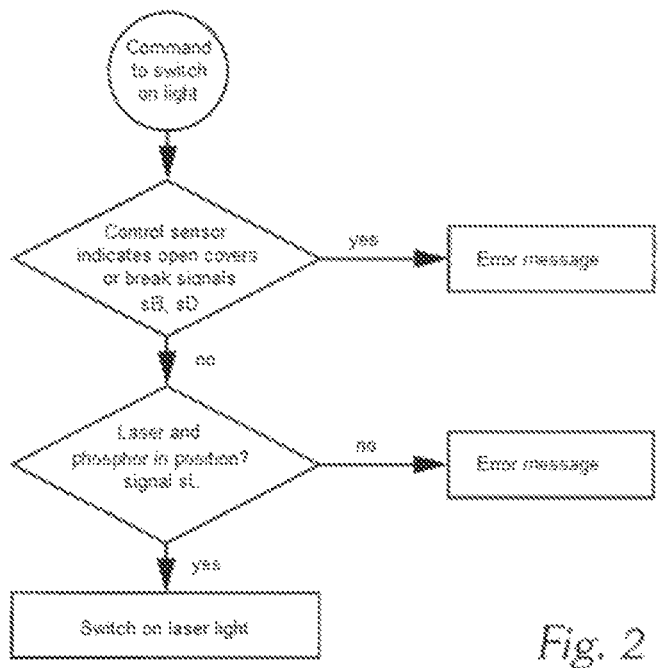
Figure 3:
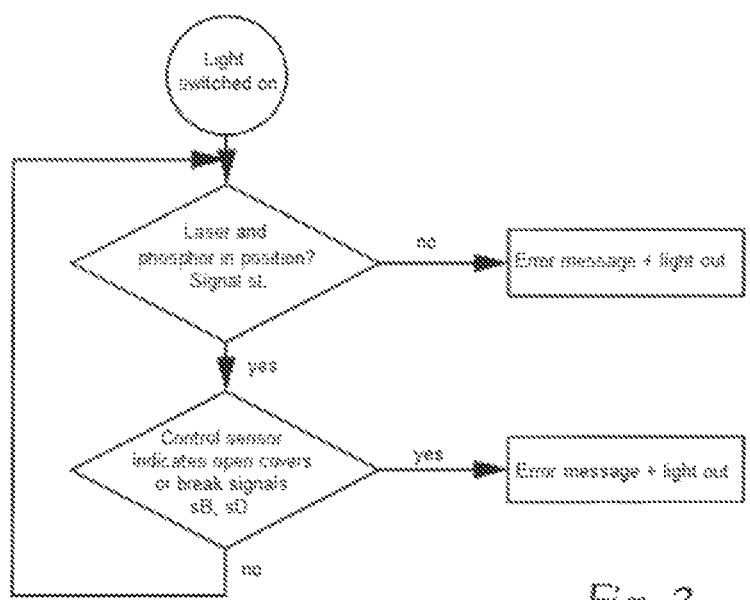

The invention and further advantages will be explained in greater detail hereinafter on the basis of exemplary embodiments, which are illustrated in the drawing and in which:

FIG. 1 shows a block diagram of a device according to the invention in a highly schematic illustration, FIG. 1a schematically shows the connection of a service device to a headlight unit, FIG. 2 shows a possible flow diagram of the method according to the invention, and FIG. 3 shows another possible flow diagram of the method according to the invention.

FIG. 1 shows a headlight unit 1, which comprises at least one laser light source 2, in particular one or more laser diodes, further comprises a light converter 3 for converting the generally short-wave laser light into white light, and generally comprises an optics 4, usually a lens/mirror system. The light converter 3 contains a fluorescent substance, referred to as a "phosphor" for short, often a oxynitride, which produces a high yield of white light where possible, matched to the wavelength of the laser light, for example see U.S. Pat. No. 7,611,642 B2. A headlight of this type is disclosed for example in US 2011/0148280 A1. A mirror, a mirror system or a vibrating mirror may also be located between the laser or plurality of lasers and the phosphor, for example as described in document DE 10 2010 028 949 A1 mentioned in the introduction. Where reference is made in this description to a headlight unit or a headlight, it is to be clear that at least one headlight will be provided (for example in the case of a motor bike), but usually at least two or more headlights, depending on the motor vehicle and requirements. A headlight unit may also comprise components not shown here, such as adjustable diaphragms, switchover means from main beam to dipped beam, and the like.

The power supply of the laser light source 2 is provided starting from a vehicle battery 5, a switch SA and a power supply 6 for the provision of suitable currents or voltages, symbolically here via a controlled on-off switch 7. Further, a conventional auxiliary headlight 8 can be provided, which for example has a halogen lamp as a lamp and can be supplied with voltage via a controlled switching means 9.

The switching means 7 and 9 are actuated by a headlight controller 10, wherein it is to be made clear that the switching means 7 and 9 can be arranged at any point, for example within the headlight controller 10, and can be formed as mechanical switches or semiconductor switches in accordance with the purpose of said switching means.

Taking into account the problems encountered by laser light sources mentioned in the introduction, sensors for monitoring safety-critical conditions are provided, in the present example a position sensor SL, which detects the positioning of the laser light source 2 with respect to the light converter 3 and outputs a position signal sL, a phosphor sensor SP, which detects the condition of the phosphor in the lamp 3 and outputs a phosphor condition signal sP, a break sensor SB, which, if significant parts of the headlight unit 1 become broken, outputs a break signal sB, and a cover sensor and/or a cover glass sensor SD, which, when a cover of the headlight unit 1 is open, outputs a corresponding cover signal sD. It can also be checked that the energy supplied from the laser to the phosphor is not so great that the phosphor becomes saturated and is subsequently transparent (equivalent to a safety-critical condition), since all electrons have been elevated into higher paths and are no longer available for excitation.

The aforementioned signals, as shown in FIG. 1, are supplied to a headlight sensor evaluation unit 11, which, with occurrence of conditions identified as critical, leads a control signal sts to the headlight controller 10. Such critical conditions may be, for example: a cover open during operation of the headlight unit 2 or a removed cover glass, an incorrect positioning of the laser light source, which radiates its light beam into the surrounding open environment instead of onto the phosphor, damage to the phosphor, or a breakage of headlight parts. The list mentioned here of course is not exhaustive, and further sensors can be provided depending on the safety requirement or design of the headlight, said sensors supplying safety-relevant signals to the headlight sensor evaluation unit 11, for example temperature sensors, which indicate an overheating.

A code memory SC for s security code is also provided in the headlight unit 1, wherein the security code is supplied as a code signal sc to the headlight sensor evaluation unit 11 or can be read out therefrom. On the other hand, a memory SN is provided in the vehicle and can be accessed by the sensor evaluation unit 11 and contains a vehicle-specific code, for example the serial number of the vehicle.

FIG. 1 further shows an airbag control device 12 of known design, to which a number of crash signals sa1, sa2, sa3 of corresponding crash sensors Sa1, Sa2, Sa3, generally acceleration sensors, are supplied and which for example controls airbags AB1, AB2, AB3 and seatbelt pre-tensioners GS1, GS2 and triggers these where necessary via a control line 13. At least one of the corresponding trigger signals is also supplied as a control signal sta to the headlight controller 10. It is clear from the above that the control signal sta may also originate rather generally from an acceleration sensor, which is independent of an airbag system.

The headlight sensor evaluation unit 11 and the airbag control device 12 thus form a monitoring arrangement 14, which can output control signals sts and sta to the headlight controller 10.

Optionally, the speed signal sv of a speed sensor Sv, which is in any case almost always provided, can be evaluated, in which case, in the exemplary embodiment, it is determined in a comparator 15 whether a predefinable speed v0 has been overshot or undershot. This information is supplied as a further control signal sty to the headlight controller 10.

Lastly, a clock generator 16 can be provided, which supplies a clock signal st to the headlight controller 10 so as to allow the examination at least of specific safety-relevant signals to be performed periodically, for example every 20 ms.

It should be stressed that the individual components of the block diagram in FIG. 1 serve primarily to illustrate the invention and are not intended to represent obligatory circuit or software geometry. By way of example, the blocks 10, 11, 12, 15 and 16 could be combined in an integrated circuit or on a chip.

A person skilled in the art will identify from the foregoing that a safety device is present that basically comprises a vehicle-side subsystem and a headlight-side subsystem, wherein the two subsystems are interconnected via an interface 17.

In the present exemplary embodiment, the headlight-side subsystem comprises the sensors SL, SP, SB, SD and the memory SC, however other components could also be contained in the headlight-side subsystem, such as the sensor evaluation unit 11, but not the memory SN for the vehicle-specific code.

The function of the invention will be explained in greater detail hereinafter, also with reference to the flow diagrams of FIGS. 2 and 3.

In normal operation, the power supply 6 is activated by switching on the switch SA and delivers a current or a voltage via the closed switch 7 to the laser light source 2 of the headlight unit 1. The relatively short-wave light of the laser light source 2 is converted in the light converter 3 preferably into white light with the aid of a fluorescent substance, referred to as a "phosphor" for short, and is output generally in a forwards direction onto the road with the aid of the optics 4 in the desired bundling.

However, various critical situations may arise, in which it is no longer ensured that the laser light of the laser light source 2 is collected by the light converter 3 and instead radiates in an uncontrolled manner in a direction in which people can be injured or blinded as a result of the laser beam on the eye. One of these cases is a collision with another vehicle or with a stationary or moving obstacle, for example a wild animal. In such a case, the headlight unit 1 may break and the laser light may irradiate in an uncontrolled manner.

For this case, in accordance with the invention, at least one of the control signals (line 13) for airbags or seatbelt pre-tensioners from the airbag control device 12 as a control signal SDa is used to immediately shutdown the laser light source 2, which for example can be implemented via the switch 7. With greater demands on safety, more sensitive accident sensors, in particular accelerations sensors, may advantageously also be provided, since airbags are only triggered at relatively high acceleration values, however a headlight may be damaged even in the case of relatively harmless accidents.

However, there are a number of other critical situations that are not directly associated with an accident and yet may lead to a release of the laser beam of the laser light source 2. For example, a mechanical fault within the headlight unit 1, caused for example by vandalism, may cause the laser beam of the laser light source 2 to no longer impinge on the appropriate point of the light converter 3, but to run past this point. For this case, the position sensor SL is provided, which, in the case of a misalignment, outputs a signal SL to the headlight sensor evaluation unit 11, which ultimately results at the output thereof in a control signal StS for the headlight controller 10 and therefore in a shutdown of the laser light source 2. In particular, it can also be checked whether the laser beam of the laser light source 2 is within a predefined tolerance range with respect to the phosphor of the light converter 3, wherein a corresponding safety-relevant signal can be output to the monitoring arrangement 14 so as to terminate the energy supply to the headlight via the headlight controller 10. In the case of a misalignment that is not acutely dangerous, a warning signal can also be output, which for example requires a visit to a vehicle workshop.

A further risk source may be a modification of the phosphor of the light converter 3, which may cause the laser light to penetrate the light converter 3 without conversion. In this case too, a safety-relevant signal sB via the sensor evaluation unit 11 and the headlight controller 10 will lead to a shutdown of the laser light source 2. Since an excessively high beam power of the laser light source may also lead to a saturation of the phosphor, it is often expedient if the power of the laser light source 2 is monitored and if the laser light source is switched off in the event that a predefined maximum power is exceeded. For example, a break sensor SB may also be provided on the housing of the headlight unit 1 and/or on the reflector thereof and/or on a cover glass and outputs a break signal sB and also leads to a shutdown of the laser light source 2. However, such break sensors advantageously may not necessarily be arranged at predetermined breaking points and for example may be adhesively bonded wires or conductive tracks. On the other hand, optical break sensors, such as light barriers, may also be used. Break sensors can also be arranged on the headlight mount, on the adjustment mechanism or on mount parts inside the headlight, for example on a supporting frame. So as to indicate an unauthorised or unintended opening of a cover and/or cover glass, that is to say of a covering of the headlight unit 1, a cover sensor SD can be provided, which likewise leads to the shutdown of the laser light source 2 by output of a corresponding signal sD.

In some cases, which occur with faults in the headlight unit 1, it is sensible to switch on a conventional auxiliary headlight 8 by the headlight controller 10 via a switch 9 so that the vehicle can continue its journey in an unimpeded manner in the dark. With a presence of one or more such auxiliary headlights 8, it may also be sensible to use the speed signal sV already described to switch on the laser light source 2 only from a certain speed, which is greater than a fixed speed v0, since at low speeds the entire luminous intensity of a headlight is not required and potential dazzling of people is avoided.

So as to avoid an inappropriate headlight, therefore representing a possible safety risk, from being mounted in a vehicle, the code stored in the code memory SC of the headlight-side subsystem can be compared in the sensor evaluation unit 11 with the vehicle-specific code of the memory SN. If the codes do not match, the control signal StS continuously interrupts the energy supply to the headlight unit 1.

In many cases, it is also sensible to perform a periodic check or interrogation of all sensors in a manner controlled by the clock generator 16, for example at intervals from 20 to 50 ms.

The monitoring arrangement 14 may also operate hierarchically in an advantageous variant, that is to say that for example signals concerning the headlight unit as such are treated with preference and are considered important. Signals or data associated with the vehicle or driving activity are thus considered as secondary safety data. This will be explained by means of an example: if an airbag is triggered, but all signals indicate no damage at the headlight unit, there is no mandatory shutdown of the laser light source so as to allow operation until a vehicle workshop is reached.

With reference to FIG. 2, it is also shown that the device according to the invention can be used to prevent the switching on of the laser light source 2 if certain faults occur. In the present case, it is checked in a first checking stage whether a covering of the headlight unit 1 is open or whether components of the headlight unit are broken, and it is checked in a second stage whether the laser light source 2 and the phosphor of the light converter 3 are oriented in the correct position. In both cases, a fault warning can be output if faults are present, or the laser light 2 is switched on if no faults are present.

A similar flow diagram of FIG. 3 shows the shutdown already described with the presence of faults and requires no further explanation apart from the mention that only some fault conditions are handled in FIG. 3, for example not a shutdown caused by response of crash sensors of the airbag controller 12.

So as to enable the headlight unit 1 to be checked either at the manufacturer's factory or in an authorised workshop, a service device 18 can be connected at the point of the vehicle-side subsystem of the safety device via the interface 17 and simulates a vehicle by means of software. This is illustrated schematically in FIG. 1a.

The invention claimed is:

1. A safety device for headlights with laser light sources configured to shutdown the laser light sources in safety-critical conditions, comprising:
   a headlight unit (1) which comprises at least one laser light source (2), a light converter (3), and an optics (4);
   a monitoring arrangement (14) configured to output control signals ($st_a$, $st_s$, $st_v$) in the presence of the safety-critical conditions;
   a headlight controller (10) configured to shutdown the at least one laser light source (2), or keep it shutdown, when the control signals ($st_a$, $st_s$, $st_v$) are supplied; and
   at least one auxiliary headlight (8) and a switch (9) controlled by the headlight controller (10), wherein the switch switches on the auxiliary headlight (8) when the at least one laser light source (2) is switched off,
   wherein:
   a signal ($s_v$) of a speed sensor ($S_v$) is supplied to the headlight controller, which is designed to switch off the at least one laser light source (2) and to switch on the auxiliary headlight (8) when a predefinable vehicle speed ($v_0$) is undershot,
   a control signal ($st_a$) is from an acceleration sensor to the headlight controller, which is designed to actuate an off switch (7) of the at least one laser light source (2) when a maximum acceleration is exceeded, or
   at least one control signal is supplied from a passive safety system comprising an airbag control device (12) to the headlight controller (10), which is designed to actuate the off switch (7) of the at least one laser light source (2) when the at least one control signal ($st_a$) is supplied.

2. The safety device according to claim 1, further comprising at least one headlight sensor ($S_L$, $S_P$, $S_B$, $S_D$) monitoring conditions of components of the headlight unit, wherein a control signal (sts) generated in the monitoring arrangement (14) is supplied to the headlight controller (10) when defective conditions are detected.

3. The safety device according to claim 1, further comprising a position sensor ($S_L$) for sensing the position of the at least one laser light source (2).

4. The safety device according to claim 1, wherein the light converter (3) comprises phosphor and wherein the safety device comprises a phosphor sensor ($S_P$) for sensing the condition of the phosphor of the light converter (3) of the at least one laser light source (2).

5. The safety device according to claim 4, further comprising at least one break sensor ($S_B$) for sensing at least one component of the headlight unit (1).

6. The safety device according to claim 1, further comprising a cover sensor and/or a cover glass sensor ($S_D$) for the headlight unit (1).

7. A method for safety shutdown of at least one laser light source (2) of at least one headlight unit (1) in a motor vehicle comprising:
   switching on at least one auxiliary headlight (8) when the at least one laser light source (2) is switched off, or kept off, upon a headlight controller receiving a safety-relevant signal corresponding to an occurrence of a critical condition,
   wherein:

the safety-relevant signal comprises a signal ($s_v$) of a speed sensor ($S_v$) supplied to the headlight controller and the critical condition occurs when a predefinable vehicle speed is undershot, the safety-relevant signal comprises a control signal (sta) of an acceleration sensor supplied to the headlight controller, or the safety-relevant signal comprises one or more control signals (sta) for airbags and/or seatbelt pre-tensioners supplied from an airbag control device (12) to the headlight controller.

8. The method according to claim 7, wherein conditions of components of the headlight unit (1) are monitored with the aid of at least one headlight sensor ($S_L$, $S_P$, $S_B$, $S_D$) and the safety-relevant signal comprises a control signal (sts) supplied to the headlight controller in the presence of faulty conditions.

9. The method according to claim 8, wherein the at least one headlight sensor monitors a position of the at least one laser light source (2).

10. The method according to claim 8, wherein the at least one laser light source (2) comprises a light converter and the at least one headlight sensor monitors the condition of the light converter.

11. The method according to claim 8, wherein the at least one headlight sensor comprises a break sensor which monitors the integrity of the headlight unit (1).

12. The method according to claim 8, wherein the at least one headlight sensor comprises a cover sensor which monitors the state of closure of at least one cover of the headlight unit (1).

13. The method according to claim 8, wherein the at least one headlight sensor monitors the power of the at least one laser light source (2) and the critical condition occurs when a predefined maximum power is exceeded.

14. A safety device for headlights with laser light sources configured to shutdown the laser light sources in safety-critical conditions, comprising:

a headlight unit (1) which comprises at least one laser light source (2), a light converter (3), and an optics (4);

a monitoring arrangement (14) configured to output control signals ($st_a$, $st_s$, $st_v$) in the presence of the safety-critical conditions;

a headlight controller (10) configured to shutdown the at least one laser light source (2), or keep it shutdown, when the control signals ($st_a$, $st_s$, $st_v$) are supplied; and at least one auxiliary headlight (8) and a switch (9) controlled by the headlight controller (10), wherein the switch switches on the auxiliary headlight (8) when the at least one laser light source (2) is switched off, wherein:

a position sensor ($S_L$) for sensing the position of the at least one laser light source (2), the light converter (3) comprises phosphor and wherein the safety device comprises a phosphor sensor ($S_P$) for sensing the condition of the phosphor of the light converter (3) of the at least one laser light source (2), at least one break sensor ($S_B$) for sensing at least one component of the headlight unit (1), or a cover sensor and/or a cover glass sensor ($S_D$) for the headlight unit (1).

15. A method for safety shutdown of at least one laser light source (2) of at least one headlight unit (1) in a motor vehicle comprising:

switching on at least one auxiliary headlight (8) when the at least one laser light source (2) is switched off, or kept off, upon a headlight controller receiving a safety-relevant signal corresponding to an occurrence of a critical condition, wherein conditions of components of the headlight unit (1) are monitored with the aid of at least one headlight sensor ($S_L$, $S_P$, $S_B$, $S_D$) and the safety-relevant signal comprises a control signal (sts) supplied to the headlight controller in the presence of faulty conditions, and wherein:

the at least one headlight sensor monitors a position of the at least one laser light source (2), the at least one laser light source (2) comprises a light converter and the at least one headlight sensor monitors the condition of the light converter, the at least one headlight sensor comprises a break sensor which monitors the integrity of the headlight unit (1), the at least one headlight sensor comprises a cover sensor which monitors the state of closure of at least one cover of the headlight unit (1), or the at least one headlight sensor monitors the power of the at least one laser light source (2) and the critical condition occurs when a predefined maximum power is exceeded.

\* \* \* \* \*

UNITED STATES PATENT AND TRADEMARK OFFICE
CERTIFICATE OF CORRECTION

PATENT NO. : 9,527,432 B2  
APPLICATION NO. : 14/369880  
DATED : December 27, 2016  
INVENTOR(S) : Ewald Tiefenbacher Page 1 of 1

It is certified that error appears in the above-identified patent and that said Letters Patent is hereby corrected as shown below:

On the Title Page

Abstract (Line 12), please change "sty)" to -- stv) --

In the Specification

Column 3, Line 48, please change "sty" to -- stv --

In the Claims

Column 6, Line 53 (Claim 5, Line 1), please change "claim 4," to -- claim 1, --

Signed and Sealed this  
Fourteenth Day of March, 2017

Michelle K. Lee  
*Director of the United States Patent and Trademark Office*